Jan. 24, 1956
C. J. BARBA
2,731,840
POWER TAKE-OFF
Filed Sept. 28, 1954
2 Sheets-Sheet 1
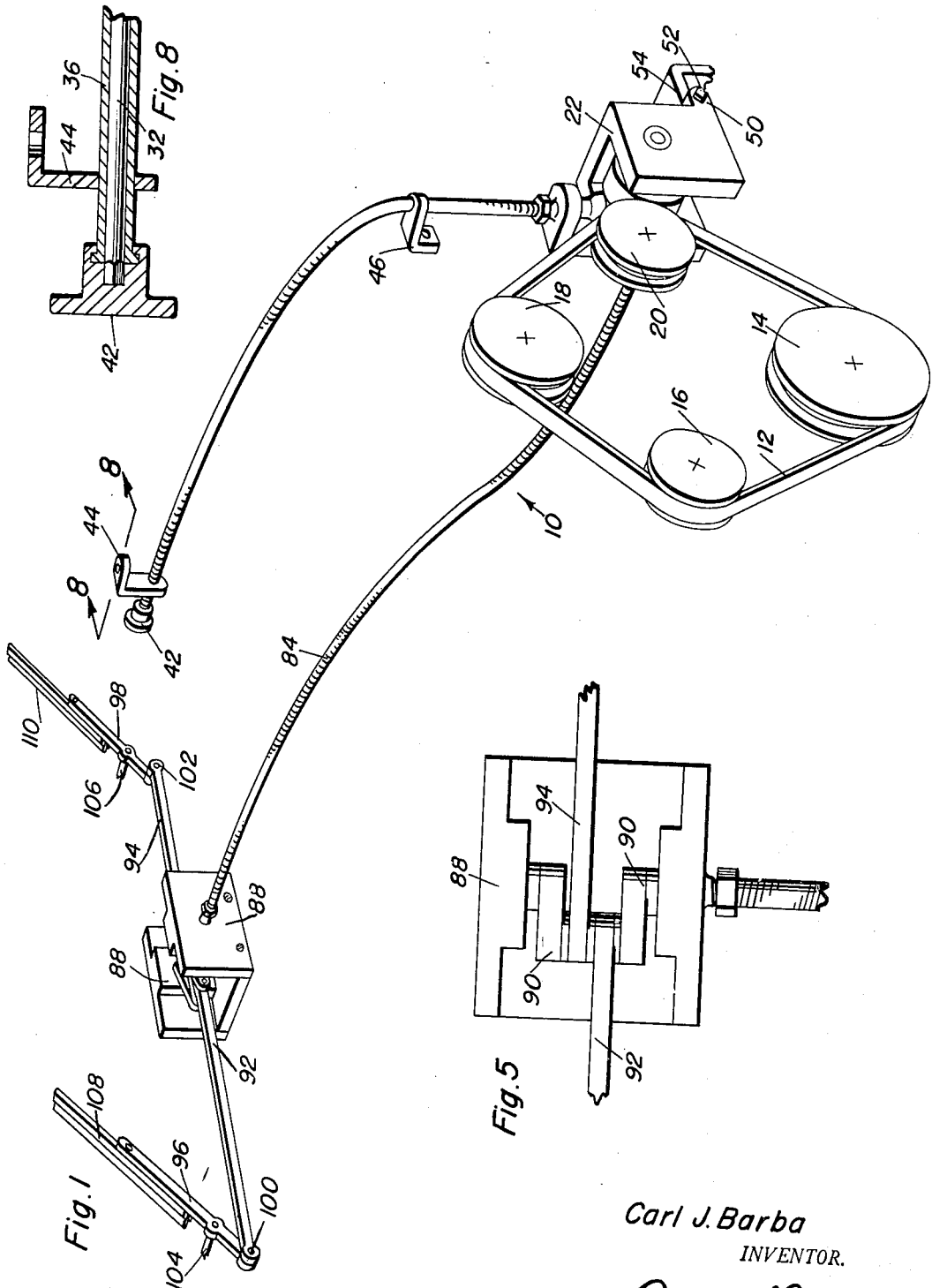
Carl J. Barba
INVENTOR.
BY *Clarence A. O'Brien*
*and Harvey B. Jacobson*
Attorneys Jan. 24, 1956
C. J. BARBA
2,731,840
POWER TAKE-OFF
Filed Sept. 28, 1954
2 Sheets-Sheet 2
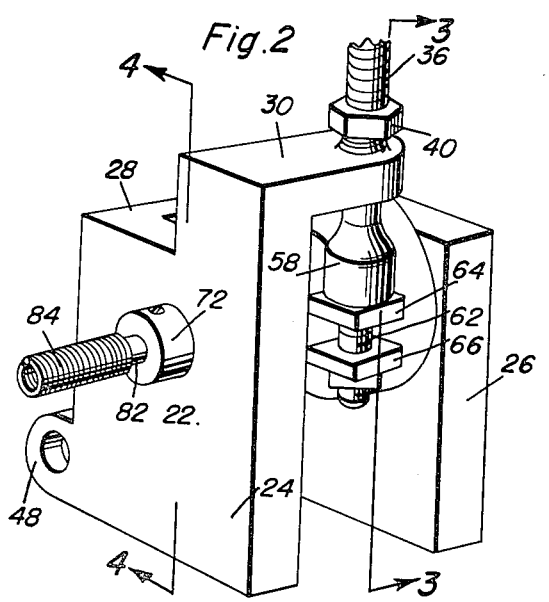
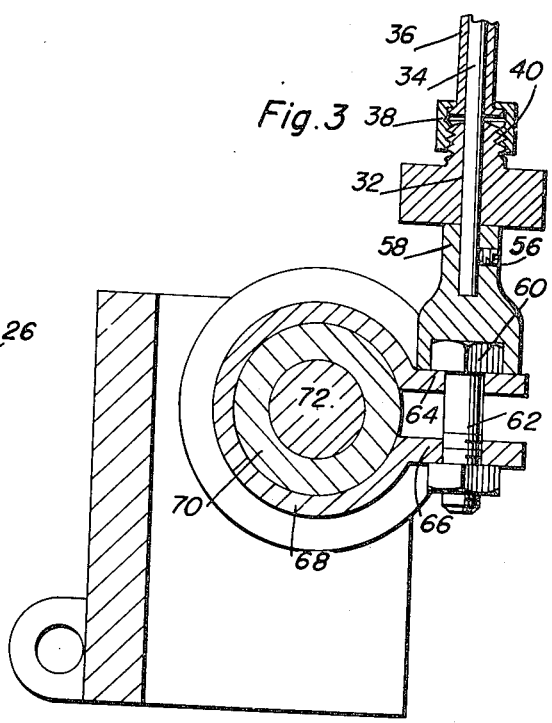
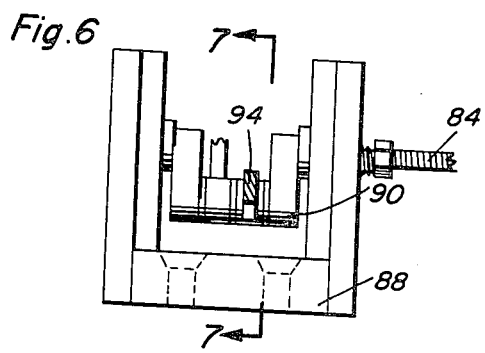
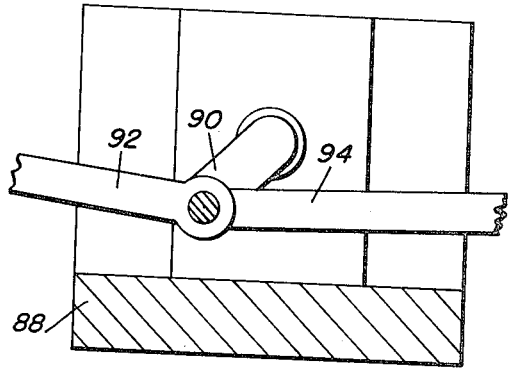
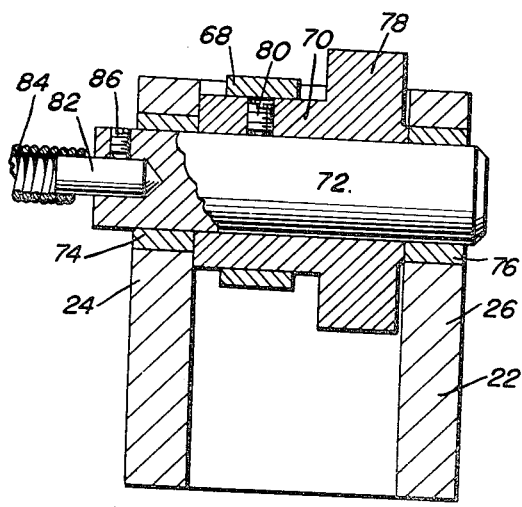
Carl J. Barba
INVENTOR.
BY *Clarence A. O'Brien*
*and Harvey B. Jacobson*
Attorneys 2,731,840
Patented Jan. 24, 1956

2,731,840

POWER TAKE-OFF

Carl J. Barba, Johnson City, N. Y.

Application September 28, 1954, Serial No. 458,735

4 Claims. (Cl. 74—15.8)

This invention relates to an attachment for an automobile or like vehicle and more particularly to a novel windshield wiper unit.

The primary object of the present invention resides in the provision of a windshield wiper unit which is based on purely mechanical operations and which eliminates the necessity of operating the windshield wiper unit by vacuum or by a separate electrical drive unit.

One of the great advantages of this invention resides in the fact that this windshield wiper unit will eliminate the problem of decreased vacuum due to the operation of a vehicle on a hill causing the slowing down of the operation of the windshield wipers while also eliminating drain of electrical current from the vehicle's battery should a separate electrical circuit be utilized for actuating the windshield wipers.

Still further objects and features of this invention reside in the provision of a windshield wiper unit that is strong and durable, simple in construction and manufacture, which is highly efficient in operation and which is inexpensive to produce, thereby permitting wide distribution and utilization.

These, together with the various ancillary objects and features of the invention which will become apparent as the following description proceeds, are attained by this windshield wiper unit, a preferred embodiment of which has been illustrated in the accompanying drawings, by way of example only, wherein:

Figure 1 is a perspective view of the various components of the windshield wiper unit;

Figure 2 is an enlarged perspective view of the housing and brake actuating mechanism;

Figure 3 is a vertical sectional view as taken along the plane of line 3—3 in Figure 2 illustrating the construction of the brake in greatest detail;

Figure 4 is a vertical sectional view as taken along the plane of line 4—4 in Figure 2;

Figure 5 is a plan view of the bellcrank operating mechanism for the windshield wipers;

Figure 6 is an end elevational view of the bellcrank actuating mechanism with a part of the linkage being shown in section;

Figure 7 is an enlarged sectional detail view as taken along the line 7—7 of Figure 6; and Figure 8 is an enlarged detail sectional view as taken along the plane of line 8—8 in Figure 1 illustrating the construction of the control knob for the windshield wiper unit.

With continuing reference to the accompanying drawings wherein like reference numerals designate similar ports throughout the various views, and with initial attention directed to Figure 1, it will be seen that the windshield wiper unit generally designated by reference numeral 10 comprises the present invention and is adapted to be utilized in association with the fan belt 12 of a conventional automotive vehicle which is entrained about a pulley 14 operated by the crankshaft of the vehicle, the fan belt 12 being entrained about pulleys drivingly connected to the water pump, fan, generator or other auxiliaries of the vehicle, these other pulleys being designated by reference numerals 16, 18 and 20.

The windshield wiper unit 10 includes a housing 22 which is preferably of U-shape having sides 24 and 26 interconnected by a cross-wall 28 and having a substantially L-shaped portion 30 forming an extension of the wall 24 and overlying the space between the walls 24 and 26. The L-shaped portion 30 has an aperture 32 therethrough through which a cable 34 is adapted to extend, the cable having an outer protective sheath 36 which is secured by a fitting 38 to a threaded portion, as at 40, of the L-shaped portion 30. The cable 34 is preferably connected to a control knob 42 mounted on the instrument panel (not shown) of a vehicle and the cable as well as the protective sheath 36 extends through and is supported by suitable brackets, as at 44 and 46 which are provided for suitably mounting the cable and sheath.

The housing 22 is provided with ears 48 and 50 which are apertured for reception of fasteners 52 used to pivotally attach the housing 22 to a bracket 54 mounted within the engine compartment of the vehicle and adjacent the fan belt 12.

The cable 32 is secured within the housing 22 by means of a setscrew 56 which engages the cable and which is threadedly secured in a fitting 58, the upper end of which engages the L-shaped portion 30. The fitting 58 is suitably secured to and overlies the head 60 of a bolt 62 or like connector which is secured to and extends between the ears 64 and 66 of a clamp member 68 which is adapted to form a friction brake for a pulley 70 mounted on a shaft 72 journaled in bearings 74 and 76 provided in the sides 24 and 26 of the housing 22. The pulley 70 includes an enlarged portion 78 adapted to frictionally engage the fan belt 12 when the housing 22 is pivoted so that the enlarged portion 78 will engage the fan belt. The pulley 70 is lockingly secured to the shaft 72 by means of a setscrew, as at 80. Further, secured to the shaft 72 and driven thereby is the end 82 of a flexible shaft 84 which is held in place by means of a setscrew 86.

The flexible cable 84 extends inwardly of a casing 88 within which there is mounted a bellcrank 90 to which links 92 and 94 are pivotally connected. The links 92 and 94 have crank arms 96 and 98 pivotally attached thereto, as 100 and 102, and the crank arms 96 and 98 are pivotally mounted adjacent the windshield of a vehicle by means of shafts 104 and 106. Attached to the crank arms 96 and 98 are windshield wiper blades 108 and 110.

The operation of this device is quite simple. When the operator of the vehicle pulls upon the control knob 42, the housing 22 will be pivoted so that the enlarged portion 78 of the pulley 70 will engage the fan belt 12. This will cause the pulley 70 to rotate, causing the rotation of the flexible shaft 84 and thus causing the oscillation of the windshield wiper blades 108 and 110. When it is desired to control the speed of operation of the blades 108 and 110, the control knob 42 can be rotated, thus causing the fastener 62 to release or tighten the clamp 68 acting as a friction brake for the pulley 70.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A power take-off and drive system for a windshield wiper for use in combination with the fan belt of an automotive vehicle comprising a pivotally mounted housing, a shaft journaled in said housing, a pulley secured to said shaft and adapted to engage the fan belt, brake means positioned about said pulley, a cable having a fitting secured to said brake means with said fitting engaging said housing whereby upon longitudinal displacement of said cable, said housing will be pivoted to engage and disengage said pulley with said fan belt and upon rotation of said cable, said fitting will actuate said brake means.

2. A power take-off and drive system for a windshield wiper for use in combination with the fan belt of an automotive vehicle comprising a pivotally mounted housing, a shaft journaled in said housing, a pulley secured to said shaft and adapted to engage the fan belt, brake means positioned about said pulley, a cable having a fitting secured to said brake means with said fitting engaging said housing whereby upon longitudinal displacement of said cable, said housing will be pivoted to engage and disengage said pulley with said fan belt and upon rotation of said cable, said fitting will actuate said brake means, said brake means including a clamp frictionally engaged about said pulley.

3. A power take-off and drive system for a windshield wiper for use in combination with the fan belt of an automotive vehicle comprising a pivotally mounted housing, a shaft journaled in said housing, a pulley secured to said shaft and adapted to engage said fan belt, brake means positioned about said pulley, a cable having a fitting secured to said brake means with said fitting engaging said housing whereby upon longitudinal displacement of said cable, said housing will be pivoted to engage and disengage said pulley with said fan belt and upon rotation of said cable, said fitting will actuate said brake means, a control knob mounted on the instrument panel of the automotive vehicle, said cable being attached to said control knob.

4. A power take-off and drive system for a windshield wiper for use in combination with the fan belt of an automotive vehicle comprising a pivotally mounted housing, a shaft journaled in said housing, a pulley secured to said shaft and adapted to engage the fan belt, brake means positioned about said pulley, a cable having a fitting secured to said brake means with said fitting engaging said housing whereby upon longitudinal displacement of said cable, said housing will be pivoted to engage and disengage said pulley with said fan belt and upon rotation of said cable, said fitting will actuate said brake means, said brake means including a clamp frictionally engaged about said pulley, a control knob mounted on the instrument panel of the automotive vehicle, said cable being attached to said control knob.

References Cited in the file of this patent
UNITED STATES PATENTS

| | | |
|---|---|---|
| 1,576,381 | Van Derbeck | Mar. 9, 1926 |
| 2,455,375 | Lindholm | Dec. 7, 1948 |